June 5, 1951 W. W. CLARK 2,555,916
MACHINE FOR BREAKING SHEETS OF CRACKERS INTO ROWS
Filed Nov. 29, 1947 2 Sheets-Sheet 1
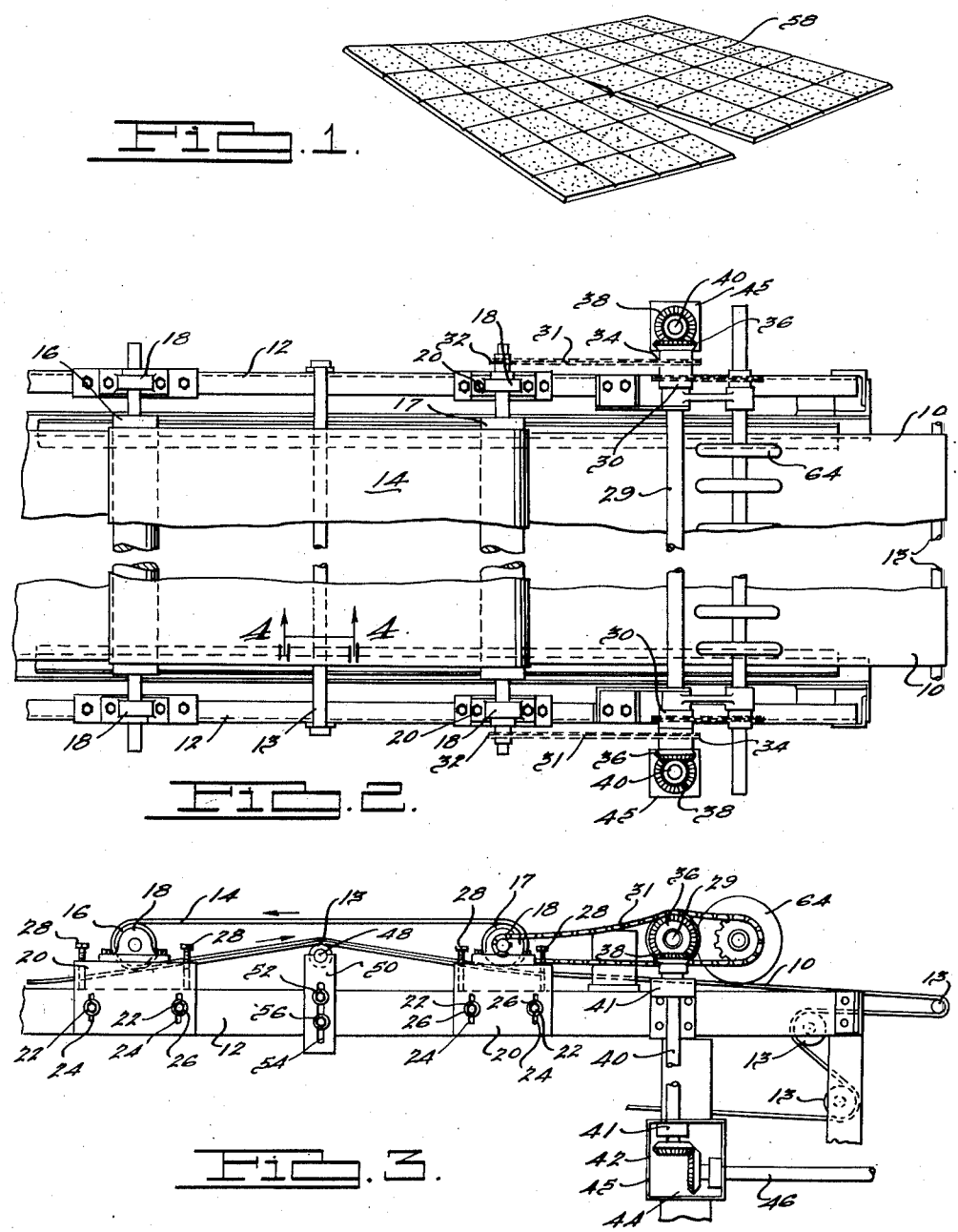
INVENTOR.
William W. Clark.
BY
Harness, Dickey & Pierce.
ATTORNEYS.

June 5, 1951 W. W. CLARK 2,555,916
MACHINE FOR BREAKING SHEETS OF CRACKERS INTO ROWS
Filed Nov. 29, 1947 2 Sheets-Sheet 2
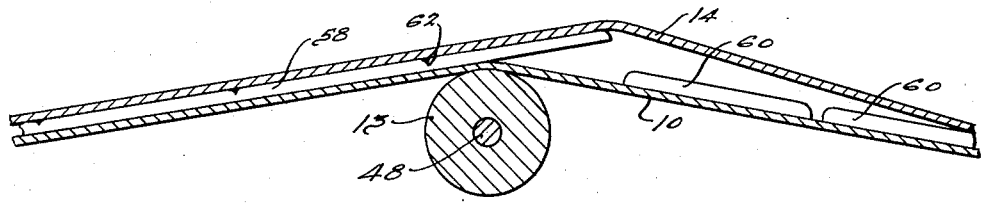
FIG. 4.
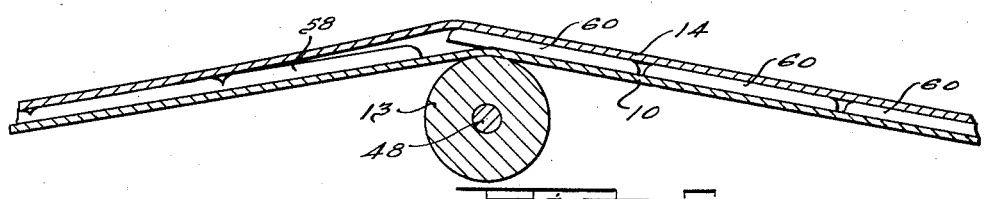
FIG. 5.
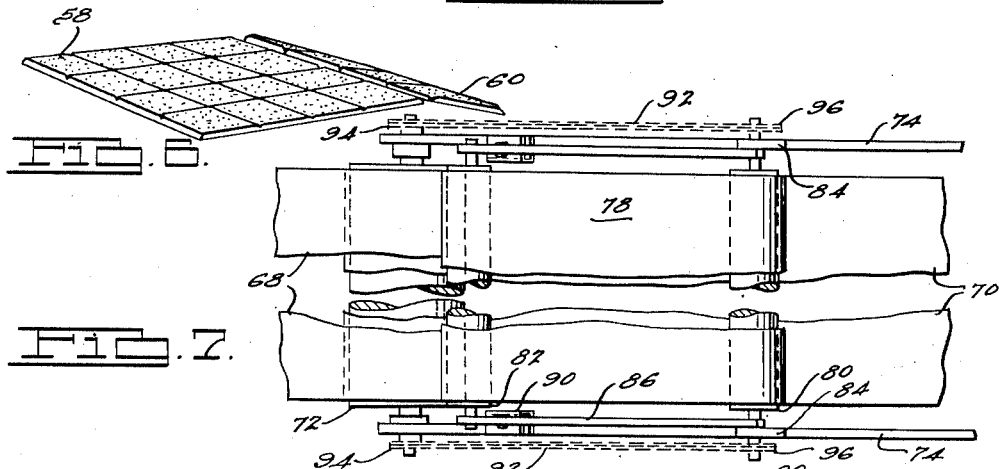
FIG. 6.
FIG. 7.
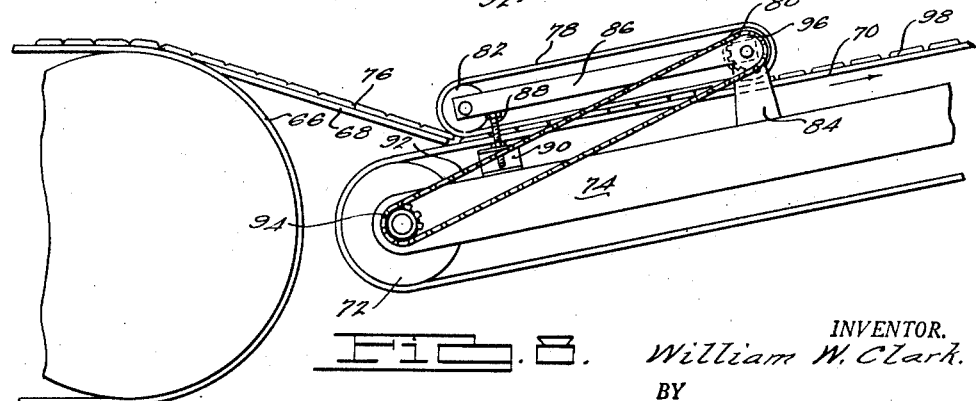
FIG. 8.
INVENTOR.
William W. Clark.
BY
Harness, Dickey & Pierce
ATTORNEYS.

Patented June 5, 1951

2,555,916

UNITED STATES PATENT OFFICE 2,555,916

MACHINE FOR BREAKING SHEETS OF CRACKERS INTO ROWS

William W. Clark, Saginaw, Mich., assignor to Baker Perkins Inc., Saginaw, Mich., a corporation of New York Application November 29, 1947, Serial No. 788,900

5 Claims. (Cl. 146—129)

This invention relates broadly to the cracker making art and more particularly to machines for breaking the crackers into rows as they come from the baking ovens.

In conventional practice, cracker dough is baked in panels or in continuous sheets, and the panels or sheets are marked or scored prior to baking to define the individual crackers. After baking, the panels are passed through mechanical apparatus which breaks them up into groups of two, four, or more crackers. Usually, the panels are broken transversely into rows, and the rows are then broken along longitudinal score lines into individual pieces which contain the desired number of crackers. As suggested, the instant invention is concerned primarily with new and useful improvements in apparatus for breaking the relatively large panels along the transverse score lines to form the individual rows of crackers.

Heretofore, the transverse breaking operation has been accomplished by providing the conveyor which carries the cracker panels from the oven with a portion which varies sharply from the normal plane of travel. When the leading edge of the panel reaches the mentioned portion of the conveyor, the marginal portion thereof is projected into space and brought against a deflector which causes it to bend and snap off at the frangible scoring immediately behind such portion. These deflectors conventionally comprise either rollers or spring fingers which are mounted in any suitable manner to engage the leading edge of the panel. The rows of crackers are then passed across rollers which break them up into the desired number of pieces.

Deflectors of the above-mentioned character have been generally successful for crackers of standard size (i. e., about two inches square or larger, but have not been successful for smaller size crackers. The standard size crackers have sufficient weight to provide the necessary frictional contact with the transport conveyor so that they are bent sufficiently by the deflector to cause the fracture to occur. The smaller size crackers, however, are not heavy enough to provide the necessary frictional contact with the transport conveyor, and consequently, do not press against the deflector with sufficient force to cause the fracture. As a result, the crackers pile up at the deflector causing jams, damage and delay. The tendency for the crackers to pile up is aggravated, of course, under conditions where it is necessary to break the crackers on an incline, since under these conditions frictional contact with the transport conveyor is even less than where the crackers are conveyed to the breaker on a horizontal plane.

Moreover, during baking, internal stresses are created in the panels which frequently causes them to buckle or warp and this sometimes produces partial fractures along certain of the score lines. Distortion of the sheet and misalignment of the individual crackers due to the above phenomenon increases the possibility of a jam occurring at the transverse breaker and almost invariably causes crushing of the crackers at the longitudinal breaking device.

An important object of the present invention is to provide apparatus for breaking the panel of crackers transversely which obviates the difficulties hereinabove referred to.

Another object of the invention is to provide a cracker breaking device of the above-mentioned character which is uniquely constructed to provide additional traction on top of the crackers to assure a positive break along the transverse score lines.

Still another object of the invention is to provide a transverse breaking device of the above-mentioned character which is uniquely constructed to counteract the effects of warping and to assure proper alignment of the crackers with both the transverse and longitudinal breaking devices.

Other objects and advantages of the invention will be apparent during the course of the following description.

In the drawing forming a part of this specification and wherein like numerals are employed to designate like parts throughout the same:

Figure 1 is a fragmentary, perspective view of a panel of crackers and illustrating a typical condition caused by warping and partial fracture of the sheet along one of the score lines;

Fig. 2 is a fragmentary, top plan view of a cracker transport conveyor and showing a transverse deflector and breaking device embodying the present invention associated therewith;

Fig. 3 is a fragmentary, side elevational view of the same;

Fig. 4 is an enlarged, fragmentary, transverse sectional view taken on the line 4—4 of Fig. 2 showing a panel of crackers associated therewith and illustrating the position of the panel just before the device breaks a transverse row of crackers from the panel;

Fig. 5 is a view similar to Fig. 4 but showing the panel just after a row of crackers has been broken therefrom;

Fig. 6 is a perspective view showing the panel of crackers at the instant of the transverse break;

Fig. 7 is a fragmentary, top plan view showing a modified form of the invention which is particularly adapted for use immediately adjacent the oven band; and Fig. 8 is a fragmentary, side elevational view of the modified construction.

In the drawings wherein for the purpose of illustration is shown a preferred embodiment of the invention, the numeral 10 designates a transport conveyor band of conventional construction which is carried by a suitable supporting framework 12 and is supported at various points along its length by suitable rollers 13. The conveyor band 10 preferably is made of canvas although any suitable flexible material such as wire mesh or the like can be used. In conventional practice, the transport conveyor band 10 carries the baked crackers from the oven (not shown) to any suitable destination such as the cooling and packaging department of the bakery. Any suitable or conventional drive means may be provided for the transport conveyor 10.

A transverse breaker mechanism embodying the present invention is associated with the transport conveyor band 10 at any suitable point along the length of the latter. The transverse breaker mechanism comprises an endless band 14 mounted above the transport conveyor band 10 with the lower run thereof resting upon and flatly engaging the conveyor. At opposite ends of the band 14 are supporting rollers 16 and 17 which are mounted for rotation in bearings 18. As best shown in Fig. 3, the bearings 18 are mounted on supporting plates 20 which, in turn, are fastened to and vertically adjustable on the supporting framework 12. In the form of the invention here shown, studs 22 on the framework 12 project outwardly through vertically elongated slots 24 in the supporting plates 20 and nuts 26 on the projecting terminal portions of the studs clamp the supporting plates in selected adjusted positions. Adjusting screws 28 carried by the supporting plates 20 bear downwardly against the framework 12 to facilitate and control vertical adjustment of the plates 20.

The upper run of the transport conveyor band 10 moves from left to right, as indicated by the arrow in Fig. 3, and the breaker band 14 is rotatably driven as indicated by the arrow in Fig. 3 so that the lower run thereof travels in the same direction and at the same speed as the transport conveyor band. In the form of the invention here shown by way of illustration, only the supporting roller 17 is power driven, and the cooperating roller 16 is driven merely through frictional engagement with the band 14. A drive shaft 29 extending transversely across the supporting framework 12 above the conveyor band 10 and at one end of the breaker band 14 is journaled for rotation in suitable supports 30. Endless chains 31 extending over sprockets 32 and 34 on the shaft of roller 17 and drive shaft 29, respectively, establish a driving connection therebetween. The drive shaft 29 may be driven in any suitable manner. In the form of the invention here shown, bevel gears 36 are fixed on opposite ends of the drive shaft 29 and the gears 36 mesh with bevel gears 38 on vertical shafts 40, which are journaled for rotation in suitable bearings 41 on the supporting framework 12. Bevel gears 42 and 44, disposed in gear boxes 45 at opposite sides of the framework 12, connect the vertical shafts 40 to horizontal drive shafts 46 which, in turn, are driven in synchronism according to conventional practice by any suitable means (not shown).

One of the idler rollers 13 is located underneath the transport conveyor band 10 and substantially midway between the terminal rollers 16 and 17. This roller 13 is carried by a shaft 48, and the ends of the shaft are journaled for rotation in suitable bearing supports 50 which are mounted for vertical adjustment on the framework 12. In the form of the invention here shown by way of illustration, studs 52 carried by the framework 12 project outwardly through vertically elongated slots 54 in the bearing supports 50, and nuts 56 on the studs clamp the bearing plates in selected adjusted positions.

In practice, the panels 58 of crackers are carried from the oven (not shown) to the breaker band 14 by the transport conveyor 10. The vertically adjustable idler roller 13 provides means for causing each panel of crackers to vary sharply from its normal path of travel and establishes a line or ridge at which transverse rows 60 of crackers are broken from the main sheet or panel 58. The tension which the lower run of the breaking band 14 exerts on the crackers may be adjusted by moving one or both of the rollers 16 and 17 vertically on the supporting framework 12 and relative to the transport conveyor 10 in the manner hereinabove described.

The transverse breaker band 14 preferably is located a sufficient distance from the oven so that the crackers are relatively cool and brittle by the time they pass under the terminal roller 16. When they reach the breaking device, the crackers are assisted up the incline by the breaking band 14 which forms an upper traction member therefor. In this connection, it will be observed that the weight of the band 14 on the panel 58 of crackers will flatten the latter and counteract to a large extent any warping or buckling of the panel which occurred during the drying operation. In this manner, positive movement of the crackers through the transverse breaking device and proper alignment of the crackers with the breaker is assured.

When the leading row of crackers reaches the breaker ridge defined by the idler roller 13, it is projected beyond the roller in the plane of the inclined surface, as shown in Fig. 4, until the weight and tension imposed by the breaker band 14 becomes sufficient to fracture the panel along the frangible score line 62 which connects the row to the panel. When the fracture occurs, the row 60 is separated from the panel 58 and the parts assume substantially the position shown in Fig. 5. From the foregoing, it will be readily apparent that this operation is repeated continuously as each successive row of crackers is moved to a position above the idler roller 13.

The breaking action is positive and, since the bands 10 and 14 cooperate to carry the rows away from the idler roller 48 after they are broken from the main panel, possibility of jamming and consequential damage to the crackers is reduced to a minimum.

After the crackers are broken into transverse rows, they are broken along the longitudinal score lines by wheels 64 in the conventional manner. These wheels 64 and their adjuncts are not a part of this invention and consequently are not described in detail.

Reference is now had to Fig. 7 which shows a modified form of cracker breaker which is primarily adapted for use near the discharge end of the baking oven. In this form of the invention, the crackers are removed from the oven band 66 by a stripper plate 68 in the conventional manner, and the crackers are still warm and flexible as they slide down the stripper plate 68 onto the transport conveyor band 70 which travels upwardly at a distinct angle thereto. At its lower end the transport conveyor band 70 extends over a roller 72 which is supported by a suitable framework 74. Only the lower portion of the transport conveyor band 70 and framework 74 is shown in the drawing; however, it will be understood that the band may extend to any suitable destination and that the roller 72 is power driven in the manner hereinabove described to carry the crackers in the direction of the arrow.

In this form of the invention, the crackers preferably are broken at the juncture of stripper plate 68 and conveyor band 70, and this can best be done by applying pressure against the top surface of the panel as it moves from the stripper plate onto the conveyor band. Inasmuch as the crackers are quite warm and contain a considerable amount of moisture, they are pliable and conform readily to the path of travel; however, the crackers are relatively thin and brittle along the score line 76 so that a slight pressure will cause a fracture to occur at this point.

The breaker used in this form of the invention comprises an endless band 78 of flexible material such as canvas, wire mesh, or the like which is trained about and is held tautly by upper and lower rollers 80 and 82. The upper roller 80 is journaled between stationary bearings 84 on the supporting framework 74, and the lower roller 82 is carried by a pair of arms 86 which are pivoted on the journals of the upper roller 80. Adjusting screws 88 carried by brackets 90 mounted on the framework 74 engage under the pivoted arms 86 and hold roller 82 spaced a selected distance above the upper run of the conveyor band 70. The upper roller 80 is rotatably driven from the roller 72 through the medium of endless chains 92 which connect sprockets 94 and 96 mounted for rotation with rollers 72 and 80 respectively. The driving relationship is such that the lower run of the breaker band 78 travels in the same direction and at the same speed as the adjacent upper run of the transport conveyor band 70.

The pivoted arms 86 are supported solely by the adjusting screws 88; and, in operation, the adjustment is such that the lower run of the breaker band 78 lies on the rows of crackers 98 as the latter pass under the breaker mechanism. The weight and traction thus afforded by the breaker 78 assists the crackers up the inclined conveyor band 70 and away from the stripper plate 68. As each row of crackers passes from the stripper plate 68 onto the conveyor band 70, it is broken from the main body or panel by the lower roller 82. Immediately after the rupture occurs, the row of crackers separated from the main panel is gripped between the conveyor band 70 and breaker band 78 and positively moved away from the point of breakage. In this manner, jams and consequential damage at the point where the rows are broken from the panel are effectively prevented.

In view of the foregoing, it will be readily apparent that I have accomplished the objects of my invention. I have provided a novel and efficient means for breaking panels of crackers into transverse rows and for immediately carrying the broken rows away from the point at which the rupture occurs. The action of the breaker is positive and is equally effective on any size of cracker. In practice, I have found that the instant constructions are much more effective than prior art devices of the type hereinabove referred to and that jams at the breaker mechanism and consequential damage to the crackers are substantially eliminated.

It is to be understood that the forms of the invention herewith shown and described are taken as preferred examples of the same and that various changes in the size, shape and arrangement of parts may be resorted to without departing from the spirit of the invention or the scope of the appended claims.

Having thus described the invention, I claim:

1. In a cracker breaking apparatus, a conveyor band having an inclined portion; a breaker band disposed above the inclined portion of said conveyor band, said breaker band having a work-inlet end and a work-discharge end and cooperative with the mentioned portion of said conveyor band to press work disposed therebetween; a driven roller at the work-inlet end of said breaker band; a stripper plate disposed above the conveyor band and arranged to deliver work to the work-inlet end of said breaker band and under said driven roller and forming an oblique angle with the conveyor band; a driving roller at the work-discharge end of said breaker band; rigid supporting arms extending between corresponding ends of the rollers; shafts carrying said rollers and journaled in said arms; stationary bearings pivotally and rotatably supporting the ends of the shafts associated with the driving roller; and adjustable stop means supporting the arms adjacent said driven roller for regulating the spacing between the bands and consequently the pressure exerted thereby against work disposed therebetween.

2. In a cracker-breaking apparatus, a conveyer band having an inclined portion; a breaker band disposed above the inclined portion of said conveyer band, said breaker band having a work-inlet end and a work-discharge end and co-operative with the mentioned portion of said conveyer band to press work disposed therebetween; a driven roller at the inlet end of said breaker band; a stripper plate extending downwardly in the opposite direction with respect to the inclined portion of said conveyer band and arranged with the proximate edge thereof substantially on the conveyer band and in proximity with said driven roller so as to deliver work substantially simultaneously onto the conveyer band and under said driven roller; a driving roller at the work-discharge end of said breaker band; rigid supporting arms extending between corresponding ends of the rollers; shafts carrying said rollers and journaled in said arms; stationary bearings pivotally and rotatably supporting the ends of the shafts associated with the driving roller; and means supporting the arms for controlling the spacing between the bands and consequently the pressure exerted thereby against work disposed therebetween.

3. In a cracker-breaking apparatus, a conveyer band having an inclined portion; a breaker band disposed above the inclined portion of said conveyer band, said breaker band having a work-inlet end and a work-discharge end and co-operative with the mentioned portion of said conveyer band to press work disposed therebetween; a driven roller at the work-inlet end of said breaker band; a stripper plate disposed above the conveyer band extending downwardly in the opposite direction with respect to the inclined portion of said conveyer band and arranged to deliver work to the work-inlet end of said breaker band and under said driven roller; a driving roller at the work-discharge end of said breaker band; means carrying said rollers and holding the same in fixed spaced relation; support means pivotally carrying said driving roller; and means for regulating the spacing between the bands and consequently the pressure exerted thereby against work disposed therebetween.

4. In a cracker-breaking apparatus, a conveyer band having an inclined portion; a breaker band disposed above the inclined portion of said conveyer band, said breaker band having a work-inlet end and a work-discharge end and co-operative with the mentioned portion of said conveyer band to press work disposed therebetween; a driven roller at the work inlet end of said breaker band, a stripper plate disposed above the conveyer band extending downwardly in the opposite direction with respect to the inclined portion of said conveyer band and arranged to deliver work to the work-inlet end of said breaker band and under said driven roller; a driving roller at the work-discharge end of said breaker band; means holding said rollers in fixed spaced relation with the breaker band disposed substantially tautly therearound, and separate support means at opposite ends of said holding means for positioning the breaker band in predetermined pressed relation with respect to said conveyer band.

5. In a cracker-breaking apparatus, a conveyer band having an inclined portion; a breaker band disposed above the inclined portion of said conveyer band, said breaker band having a work-inlet end and a work-discharge end and co-operative with the mentioned portion of said conveyer band to press work disposed therebetween; a driven roller at the work-inlet end of said breaker band, a stripper plate disposed above the conveyer band extending downwardly in the opposite direction with respect to the inclined portion of said conveyer band and arranged to deliver work to the work-inlet end of said breaker band and under said driven roller; a driving roller at the work-discharge end of said breaker band; means holding said rollers in fixed spaced relation with the breaker band disposed substantially tautly therearound, and separate support means at opposite ends of said holding means, at least one of said support means being adjustable to regulate the spacing between the bands and consequently the pressure exerted thereby against work disposed therebetween.

WILLIAM W. CLARK.

REFERENCES CITED

The following references are of record in the file of this patent:

UNITED STATES PATENTS

| Number | Name | Date |
|---|---|---|
| 234,122 | Fredenbagen | Nov. 9, 1880 |
| 1,108,163 | Frick | Aug. 25, 1914 |
| 1,401,268 | Manischewitz | Dec. 27, 1921 |
| 2,021,376 | Pierce | Nov. 19, 1935 |
| 2,252,362 | Carus | Aug. 12, 1941 |
| 2,261,062 | Huber | Oct. 28, 1941 |

FOREIGN PATENTS

| Number | Country | Date |
|---|---|---|
| 63,396 | Austria | Feb. 10, 1914 |